United States Patent
Luy et al.

(10) Patent No.: US 11,231,356 B2
(45) Date of Patent: Jan. 25, 2022

(54) OPTICAL CELL AND METHODS OF MANUFACTURING AN OPTICAL CELL

(71) Applicant: DARTMOUTH OCEAN TECHNOLOGIES INC., Dartmouth (CA)

(72) Inventors: Edward Arthur Luy, Halifax (CA); Sean Christopher Morgan, Halifax (CA); Vincent Joseph Sieben, Bedford (CA)

(73) Assignee: DARTMOUTH OCEAN TECHNOLOGIES INC., Dartmouth (CA)

(*) Notice: Subject to any disclaimer, the term of this patent is extended or adjusted under 35 U.S.C. 154(b) by 0 days.

(21) Appl. No.: 17/285,932

(22) PCT Filed: May 29, 2020

(86) PCT No.: PCT/CA2020/050738
§ 371 (c)(1),
(2) Date: Apr. 16, 2021

(87) PCT Pub. No.: WO2020/237389
PCT Pub. Date: Dec. 3, 2020

(65) Prior Publication Data
US 2021/0318230 A1 Oct. 14, 2021

Related U.S. Application Data

(60) Provisional application No. 62/854,602, filed on May 30, 2019.

(51) Int. Cl.
*G01N 21/01* (2006.01)

(52) U.S. Cl.
CPC ..... *G01N 21/01* (2013.01); *G01N 2201/0636* (2013.01)

(58) Field of Classification Search
CPC . G01N 21/01; G01N 2201/0636; B01L 3/502
(Continued)

(56) References Cited

U.S. PATENT DOCUMENTS

| 9,025,152 B2 | 5/2015 | Floquet et al. |
| 2006/0044554 A1* | 3/2006 | Mertz ................ G01N 21/0332 356/246 |

(Continued)

OTHER PUBLICATIONS

International Search Report & Written Opinion in PCT/CA2020/050738 dated Sep. 1, 2020, 7 pages.
(Continued)

*Primary Examiner* — Roy M Punnoose
(74) *Attorney, Agent, or Firm* — Pearne & Gordon LLP

(57) ABSTRACT

An optical cell for performing light spectroscopy (including absorbance, fluorescence and scattering measurements) on a liquid sample in microfluidic devices is disclosed. The optical cell comprises an inlaid sheet having an opaque material inlaid in a clear material, and a sensing channel that crosses the clear material and the opaque material provides a fluidic path for the liquid sample and an optical path for probe light. Integral optical windows crossing a clear-opaque material interface permit light coupling into and out of the sensing channel, and thus light transmission through the sensing channel is almost entirely isolated from background light interference. A microfluidic chip comprising one or more optical cells is also disclosed. The optical cells may have different lengths of sensing channels, and may be optically and fluidly coupled. A method of manufacturing an optical cell in a microfluidic chip is also disclosed.

24 Claims, 11 Drawing Sheets

(58) Field of Classification Search
USPC .......................................................... 356/246
See application file for complete search history.

(56) References Cited

U.S. PATENT DOCUMENTS

| | | |
|---|---|---|
| 2011/0222066 A1 | 9/2011 | Forcales et al. |
| 2016/0018316 A1* | 1/2016 | Rohrer .................. G01J 5/0875 359/511 |
| 2018/0003619 A1 | 1/2018 | Sieben et al. |

OTHER PUBLICATIONS

Grumann, et al. "Optical Beam Guidance in Monolithic Polymer Chips for Miniaturized Colorimetric Assays." IMTEK, IEEE, 2005, 4 pages.

Ogilvie, et al. "Reduction of surface roughness for optical quality microfluidic devices in PMMA and COC" Journal of Micromechanics and Microengineering. Vol. 20. May 14, 2010. 9 pages.

Ogilvie, et al. "Solvent Processing of PMMA and COC Chips for Bonding Devices with Optical Quality Surfaces." 14th International Conference on Miniaturized Systems for Chemistry and Life Sciences. Oct. 3-7, 2010, Groningen, The Netherlands. pp. 1244-1246.

Ogilvie, Iain. "Novel fabrication techniques for microfluidic based in-situ oceanographic nutrient sensors: Chapter 3 Manufacturing Robust Micro Fluidic devices." 2012. pp. 24-28.

* cited by examiner

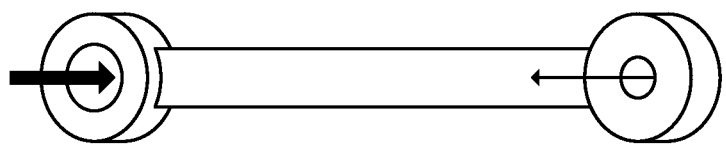
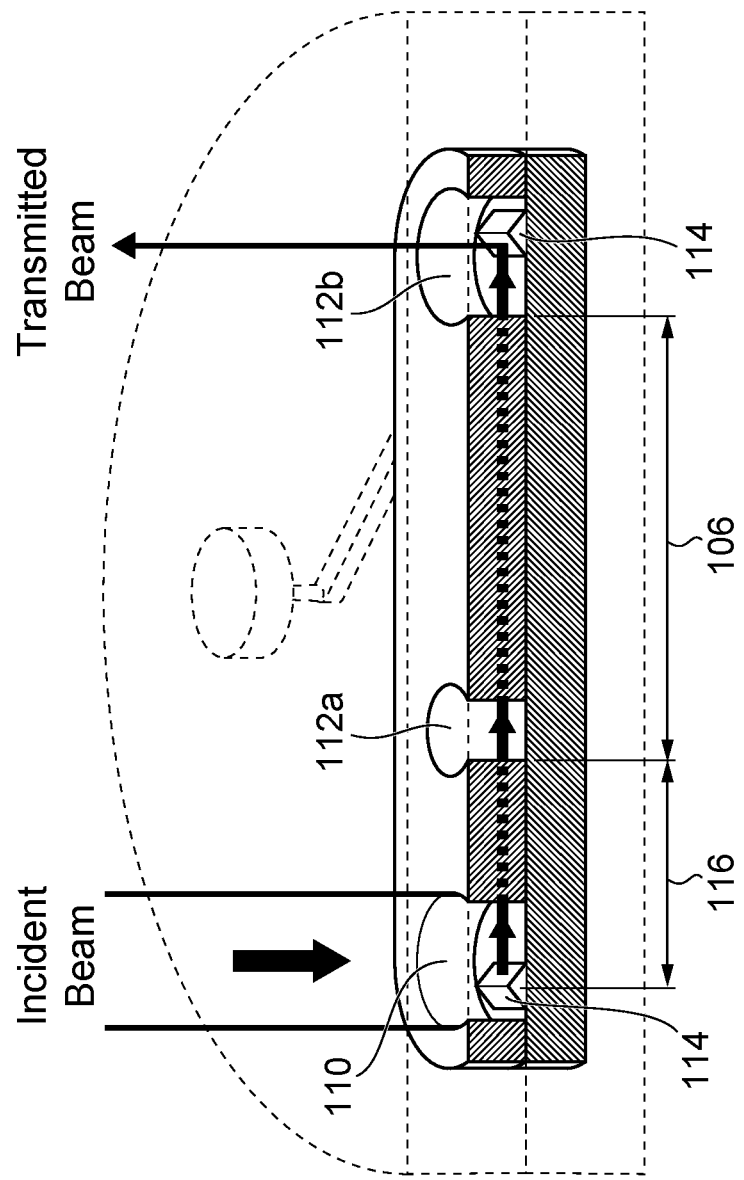

OPTICAL CELL AND METHODS OF MANUFACTURING AN OPTICAL CELL

CROSS-REFERENCE TO RELATED APPLICATIONS

This application claims the benefit of U.S. Provisional Patent Application No. 62/854,602, filed on May 30, 2019, the entire contents of which is incorporated herein by reference for all purposes.

TECHNICAL FIELD

The present disclosure relates to light spectroscopy for analyzing a liquid sample, and in particular to an optical cell for performing light spectroscopy.

BACKGROUND

Microfluidic technologies manipulate small amounts of fluid within channels for resource-efficient processes. Lab-on-a-chip (LOC) systems use microfluidic platforms to miniaturize standard analysis techniques, integrating one or several laboratory functions onto one device. These devices combine as many bench top fluid analysis methods as possible to a single, small-scale, low-power chip. Reduced sample sizes enables more cost-, energy-, and reagent-efficient analyses that produce less waste.

Furthermore, these devices may be automated to reduce—or even eliminate—the needed level of human involvement in environmental sampling and analysis. With in situ analysis capabilities, conventional risks of sample contamination during transport from field to lab are removed and collected data are more reliable. Possibilities of human error are reduced, and hazardous environments or chemicals may be handled with minimal risk to human life. The generally small form factor of microfluidic systems allows them to be less environmentally invasive than other methods, and their smaller sample sizes mean that they are also less destructive. Furthermore, they have the potential to do measurements at high pressures, which has been useful for prolonged sensor deployment in ocean environments.

A microfluidic absorbance cell may utilize screwed-in or epoxy-fixed fibers to couple light to/from a flow cell for sample inspection. However, fiber-based designs tend to be less transferrable from the lab to the field, where slight mechanical shocks/vibrations can result in reduced optical coupling and sensor measurement error. Alternatively, low-cost robust optical absorbance measurements may be realized by using the chip material itself. A completely integrated absorbance cell in chips fabricated from carbon-doped (tinted) semi-transparent PMMA has been developed, however it is based on a challenging alignment and fabrication process and requires either UV-curable or time setting two-part epoxies to completely immerse the LED and photodiode to hold them in perfect alignment to the microchannel. This requires a skilled and tedious workflow during the manufacturing process of these devices, where measurements must be taken to ensure optical alignment.

Accordingly, an optical cell and methods of manufacturing thereof remain highly desirable.

SUMMARY

In accordance with one aspect of the present disclosure, an optical cell for performing light spectroscopy on a liquid sample is disclosed, comprising: an inlaid sheet comprising an opaque material inlaid within a clear material; a sensing channel having first and second ends and providing a fluidic path for the liquid sample and an optical path for probe light between the first and second ends, wherein the sensing channel crosses the clear material and the opaque material; an optical input opening coupled with the first end of the sensing channel for delivering the probe light to the sensing channel; and at least one optical detection opening coupled with the sensing channel for receiving the probe light having interacted with the liquid sample.

In some aspects, the at least one optical detection opening comprises a first optical detection opening coupled to the sensing channel proximate the first end.

In some aspects, the sensing channel has a well structure with increased fluid volume where the first optical detection opening is coupled to the sensing channel.

In some aspects, the at least one optical detection opening comprises a second optical detection opening coupled with the second end of the sensing channel.

In some aspects, the optical cell further comprises fluid inlet and outlet ports respectively coupled with the first and second ends of the sensing channel.

In some aspects, the optical cell further comprises fluid inlet and outlet channels arranged in the clear material and respectively coupled with the fluid inlet and outlet ports.

In some aspects, the fluid inlet and outlet channels are coupled to the fluid inlet and outlet ports at at least one angle of 135 degrees or less relative to the sensing channel.

In some aspects, the fluid inlet and outlet channels are coupled to the fluid inlet and outlet ports at opposing sides of the sensing channel.

In some aspects, the optical input opening and the at least one optical detection opening extend from a surface of the layer of clear material to a depth of the sensing channel.

In some aspects, the optical input opening comprises an input prism disposed in the optical input opening at the depth of the sensing channel for directing the probe light into the sensing channel.

In some aspects, an optical detection opening of the at least one optical detection opening comprises an output prism disposed in the optical detection opening at the depth of the sensing channel for directing the probe light out of the optical cell.

In some aspects, the optical input opening and the at least one optical detection opening are surrounded by the opaque material.

In some aspects, the optical cell further comprises a light guide channel extending within the inlaid sheet and coupling the optical input opening and the first end of the sensing channel.

In some aspects, the opaque material has approximately 0% light transmittance.

In some aspects, the clear material has greater than approximately 90% light transmittance.

In some aspects, one or both of the opaque material and the clear material are configured to filter selected wavelengths.

In some aspects, the sensing channel has a length between 0.1 mm and 100 mm.

In some aspects, the inlaid sheet comprises first and second inlaid sheets bonded together, the first inlaid sheet comprising a first opaque material inlaid in a recess of a first layer of clear material, and the second inlaid sheet comprising a second opaque material inlaid in a recess of a second layer of clear material; and wherein the sensing channel is provided at an interface of the first and second inlaid sheets.

In accordance with another aspect of the present disclosure, a microfluidic cell is disclosed, comprising the optical cell of any of the above aspects.

In accordance with another aspect of the present disclosure, a microfluidic cell is disclosed, comprising a plurality of optical cells of any of the above aspects.

In some aspects, the plurality of optical cells are fluidly coupled to each other such that the liquid sample flows through the plurality of optical cells in series.

In some aspects, the plurality of optical cells are optically coupled to each other via optical reflectors.

In some aspects, a total optical path length of the plurality of optical cells is up to 10 m.

In some aspects, a length of the sensing channel of at least two optical cells is different, the length of each of the sensing channels being between 0.1 mm and 100 mm.

In accordance with another aspect of the present disclosure, a method for manufacturing an optical cell in a microfluidic chip is disclosed, comprising: cutting first and second inserts of an opaque material; cutting recesses in first and second sheets of clear material for respectively receiving the first and second inserts of the opaque material; inserting the first and second inserts of opaque material into the recesses of the first and second sheets of clear material to form first and second inlaid sheets; cutting a sensing channel along a bonding surface of at least one of the first and second inlaid sheets, the sensing channel crossing the clear material and the opaque material; and bonding the first and second inlaid sheets together.

In some aspects, the method further comprises defining an optical input opening and at least one optical detection opening in the first layer of clear material, wherein the optical input opening is coupled with a first end of the sensing channel, and wherein the at least one optical detection opening is coupled with the sensing channel.

In some aspects, the method further comprises cutting a prism in the optical input opening at a depth of the sensing channel.

In some aspects, an optical detection opening of the at least one optical detection opening is coupled with a second end of the sensing channel, and the method further comprises cutting a prism in the optical detection opening at a depth of the sensing channel.

In some aspects, the first insert of the opaque material surrounds the optical input opening and the at least one optical output opening.

In some aspects, the method further comprising cutting a light guide channel extending along the bonding surface of at least one of the first and second inlaid sheets, wherein the light guide channel couples the optical input opening and the sensing channel.

In some aspects, the method further comprises cutting fluid inlet and outlet ports respectively coupled with first and second ends of the sensing channel.

In some aspects, the method further comprises cutting fluid inlet and outlet channels coupled to the fluid inlet and outlet ports.

In some aspects, the opaque material has approximately 0% light transmittance.

In some aspects, the clear material has greater than approximately 90% light transmittance.

In some aspects, one or both of the opaque material and the clear material are configured to filter selected wavelengths.

In some aspects, the sensing channel has a length between 0.1 mm and 100 mm.

In some aspects, a cross-section of the sensing channel is between 0.01 mm and 1 mm.

In some aspects, the first and second sheets of clear material are a single sheet of clear material, and wherein the first and second inlaid sheets are cut from the single sheet.

BRIEF DESCRIPTION OF THE DRAWINGS

Further features and advantages of the present disclosure will become apparent from the following detailed description, taken in combination with the appended drawings, in which:

FIGS. 2A and 2B show a representation of light passing through an optical cell;

It will be noted that throughout the appended drawings, like features are identified by like reference numerals.

DETAILED DESCRIPTION

Figure 1A:
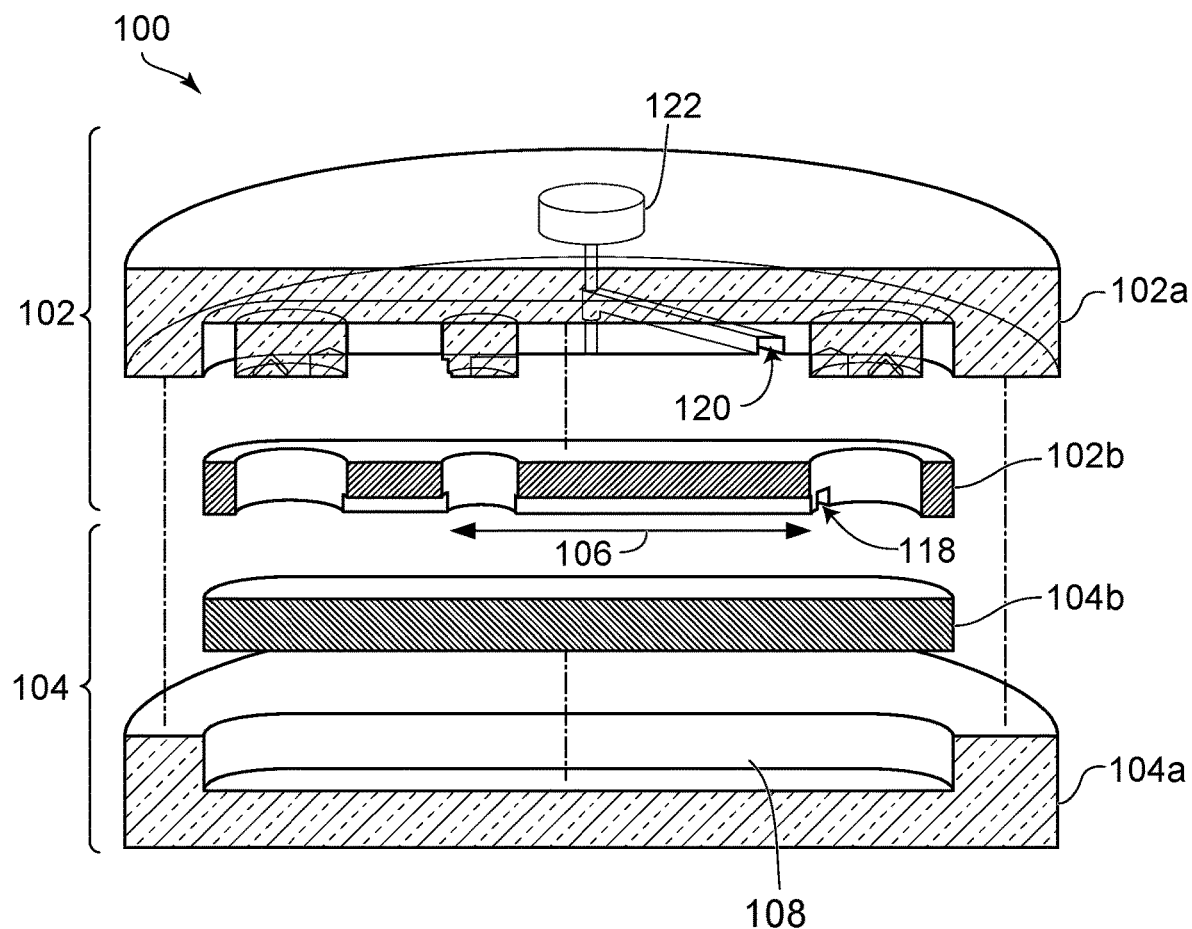
FIG. 1A shows an exploded cross-sectional view of a microfluidic chip comprising an inlaid optical cell.

The present disclosure provides a new technique for implementing light spectroscopy in microfluidic devices in which optically-isolated cells are created within clear materials. This technique creates what is referred to herein as an inlaid optical cell, combining clear and opaque materials into one fluidly-sealed device. In accordance with the present disclosure, an optical cell is disclosed that combines clear and opaque (~0% transmission) to completely attenuate background light without diminishing source intensity. This technique also introduces the possibility of directing light in/out of the chip using integrated v-groove prisms (which is difficult to achieve using chips made of one uniform tinted material, for example).

An optical cell for performing light spectroscopy (including absorbance, fluorescence and scattering measurements) on a liquid sample in microfluidic devices is disclosed. The optical cell comprises an inlaid sheet having an opaque material inlaid in a clear material, and a sensing channel that crosses the clear material and the opaque material provides a fluidic path for the liquid sample and an optical path for probe light. Integral optical windows crossing a clear-opaque material interface permit light coupling into and out of the sensing channel, and thus light transmission through the sensing channel is almost entirely isolated from background light interference. The design of the optical cell allows for manipulating small (micro-litre to femto-litre scale) amounts of fluid within channels of dimensions on the micro-meter scale. The inlaid optical cell does not rely on epoxies to align or hold the source and detector, and advantageously allows for changing the light source and detector combination for different chemistries on the same chip design without detaching optics/epoxy fixatives that would risk damaging the microfluidic chip. This design is highly manufacturable, as repeatable and robust optical alignment can be achieved through standard manufacturing practices of component placement on printed circuit boards (PCBs).

A microfluidic chip comprising one or more optical cells is also disclosed. The optical cells may have different lengths of sensing channels, and may be optically and fluidly coupled. A method of manufacturing an optical cell in a microfluidic chip is also disclosed.

Light-absorbance measurements are enabled by transmitting light from an LED through various fluids contained in a sensing channel to a light-to-voltage converter (photodiode) for detection. To couple light into and out of the channel, the optical cell as disclosed herein employs prisms, as further described with reference to FIG. 1. According to Snell's law, light of wavelength $\lambda$, will undergo total internal reflection (TIR) at the cell-air prism interface, so long as the angle of incidence $\theta_i$ exceeds the critical angle $\theta_c$:

$$\theta_c = \sin^{-1}\left(\frac{n_2(\lambda)}{n_1(\lambda)}\right) \quad (1)$$

where $n_1(\lambda)$ and $n_2(\lambda)$, the refractive indices of the cell material and air, are functions of the light wavelength. Where poly(methyl methacrylate) (PMMA) is used as the cell material, the angle of interface may for example be 45° to the incident beam on both prisms.

Absorbance spectroscopy is a common and well-established technique for biological and chemical analysis, either in continuous or stopped-flow configurations. It is a simple, quick, and robust method of detecting the presence of a species within a fluid sample provided the analyte concentration is relatively low and that it has an accessible/unique absorbance spectrum. Incident light passing through a sample will attenuate depending on the molecular absorbance spectrum of the sample, the scattering from particles in the fluid, and the spectrum of incident light. For molecular absorbance, the molecules within the analyte may become excited and thus absorb energy from the incident waves as electrons are promoted to higher energy bands. The relative drop in light energy—or equivalently its intensity—can be used to calculate the absorbance of the sample using the Beer-Lambert law, $$A = -\log_{10}\left(\frac{I}{I_0}\right) = \epsilon l c, \quad (2)$$

where absorbance A depends on the ratio of incident to transmitted light intensities, $I_0$ and $I$, respectively. The intensities are used to find the concentration c of the absorbing species as a function of the optical path length l and the attenuation coefficient of the analyte $\epsilon$. Here, the effects of scattering attenuation can be ignored as the fluid samples are sufficiently filtered. Significantly, the detection sensitivity has a linear dependence on the length of the optical channel: a challenge for microfluidic devices that aim to minimize physical size.

Interference from ambient background light—light which reaches the detector without passing through the sample—must be quantified or otherwise minimized. Equation (2) may be modified to eliminate these external influences and is expressed in the following equivalent forms:

$$A_{corr} = -\log_{10}\left(\frac{I - I_{bg}}{I_0 - I_{bg}}\right) = A + \log_{10}\left(\frac{1 - I_{bg}/I_0}{1 - I_{bg}/I}\right) = A + \delta \ (\delta \geq 0), \quad (3)$$

where $I_{bg}$ is the intensity of background light measured by the detector when the light source is turned off. This background intensity is subtracted off each sample and blank measurement to calculate the corrected absorbance of the sample $A_{corr}$. The corrected absorbance is always greater or equal to the uncorrected absorbance A since $\forall I_{bg} \leq 0$, $\delta \geq 0$. This follows directly from the fact that $I_0 \geq I$ since light intensity is at its maximum when passing through a colorless blank. In practice, however, Schlieren mixing effects and refractive index mismatches that are thermal/composition based can lead to this being not true.

Furthermore, it can be proved that higher-concentrated samples experience more severe corrections than lower-concentrated samples. Sample concentration and the detected intensity of light that has passed through them, I, are negatively or inversely related. Evaluating the change in $\delta$ with respect to I while holding all other variables constant, we see:

$$\frac{\partial \delta}{\partial I} = \frac{1}{\ln 10} \times \frac{I_{bg}}{I(I_{bg} - I)} < 0. \quad (4)$$

Equation (4) is always negative since $0 \leq I_b < I$, indicating a negative relationship between I and $\delta$. As stated above, sample concentration and I are also negatively related, and so it follows that sample concentration and $\delta$ are positively related and higher-concentrated samples experience larger corrections. In other words, the amount of light detected is less for highly concentrated samples, and therefore, any background light detected has a greater influence on the absorbance. Detection of background light must therefore be quantified for every sample, particularly when highly concentrated samples are being measured.

UV/vis spectroscopy is well suited for microfluidic platforms, and biosensors, as an example, may use UV/vis OAS to determine concentrations of nutrients or other biological entities within samples or in situ within sections of an environment. Microfluidic absorption spectroscopy may be used for analyzing biofilms, studying single molecules in enzymatic reactions, detecting the presence of specific bacteria species, cellular phenotyping, detecting changes in cell morphology and many other applications. Beyond biosensing, microfluidic sensors have potential for use in the nuclear industry for actively determining actinide concentrations produced during the PUREX process, pharmaceutical development, and even detecting pollutants produced by dental rinses.

The present disclosure introduces a new inlaid approach of an optical cell for performing light spectroscopy, and is capable of performing not only absorption measurements but also fluorescence and scattering. The optical cell may be particularly useful in marine environments. The world's oceans have thus far been grossly under-sampled. Traditional approaches to sensing in these environments are labour-, time-, and resource-intensive, depending on manually-collected bottle samples from the ocean for analysis far-away in a lab. Consequently, much about the world's oceans is unknown. With a goal of developing cheap, easy-to-produce, nutrient sensors that can be mass-deployed in the oceans, the performance of the inlaid optical cells disclosed herein is demonstrated. Low-power, low-contact microfluidic sensors have the potential to remedy these issues and provide much needed data about the state of the oceans. A person skilled in the art will also appreciate that the optical cell as disclosed herein is not limited to such applications, and that the optical cell may be used in other fields without departing from the scope of this disclosure.

Embodiments are described below, by way of example only, with reference to FIGS. 1-10.

Figure 1B:
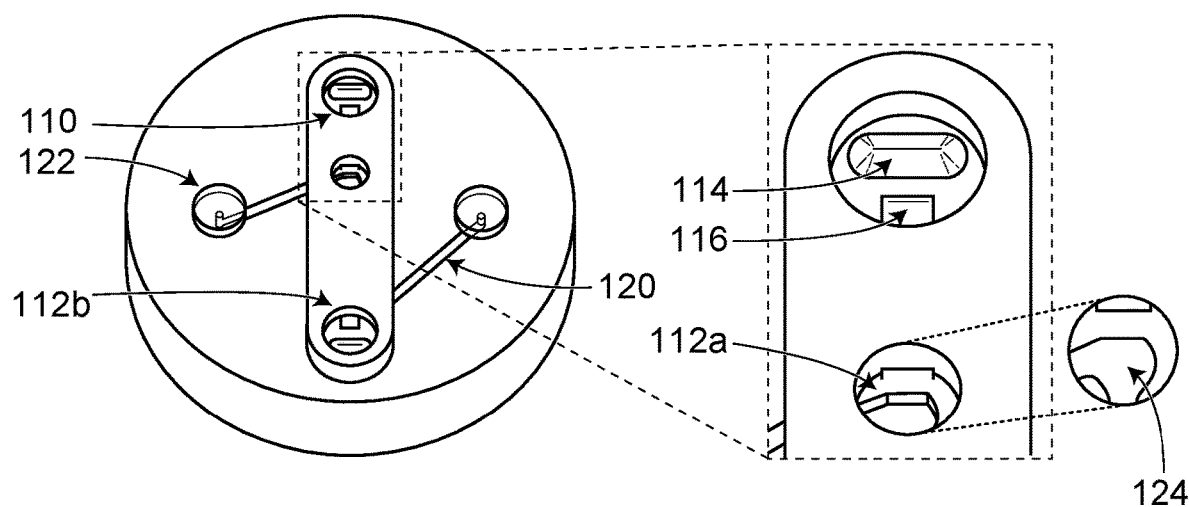
FIG. 1B shows a perspective view of a microfluidic chip comprising an optical cell.

Reference is made concurrently to FIGS. 1A and 1B and FIGS. 2A and 2B. FIG. 1A shows an exploded cross-sectional view of a microfluidic chip 100 comprising an optical cell. FIG. 1B shows a perspective view of a microfluidic chip comprising an optical cell. FIGS. 2A and 2B show a representation of light passing through an optical cell.

The optical cell comprises a first inlaid sheet 102 and a second inlaid sheet 104 that are bonded together and which define a sensing channel 106 there-between. The sensing channel 106 has first and second ends and provides a fluidic path for a liquid sample and an optical path for probe light between the first and second ends. The sensing channel 106 may have various lengths, but is generally between 0.1 mm and 100 mm depending on the application. A characteristic cross-section of the sensing channel 106 may be between 10 micrometers and 1 mm.

Each of the first and second inlaid sheets 102, 104, comprise a clear material 102a, 104a, and an opaque material 102b, 104b inlaid in the clear material 102a, 104a. Specifically, the clear material 102a, 104a comprises recesses (see, e.g., recess 108 in the bottom clear material 104a) that the opaque material 104b is inserted into. The opaque material 102b, 104b has approximately 0% light transmittance such that only light that travels within the sensing channel persists, while the clear material 102a, 104a has greater than approximately 90% light transmittance. Moreover, one or both of the opaque material and the clear material may be configured to filter selected wavelengths, which enables integral optical filtering within the microfluidic device. At least one of the first and second inlaid sheets 102, 104 (in FIG. 1A, the first inlaid sheet 102) comprises a cut-out in a bonding surface thereof that defines the sensing channel 106 when bonded with the other inlaid sheet (in FIG. 1A, when bonded with the second inlaid sheet 104).

Note that while FIG. 1A shows the optical cell comprising first and second inlaid sheets 102, 104 bonded together, the optical cell could instead be formed from a single inlaid sheet comprising an opaque material inlaid within a clear material. The single inlaid sheet may for example be made from a 3D printer that prints hybrid materials. In this case, the sensing channel may be provided within the inlaid sheet, instead of enclosed by two inlaid sheets bonded together.

The inlaid sheets 102 and 104 may for example be made from a plastic such as PMMA. PMMA sheets are typically manufactured in one of two ways, each with different bonding behavior. The first, cast PMMA, is produced by casting liquid methyl methacrylate monomer into a mould made of glass for polymerization. The second, extruded PMMA, is produced in sheets of more uniform thicknesses by shaping melted acrylic monomers with a die. Extruded PMMA is the type of acrylic that is exemplary used in certain embodiments herein, though inlaid optical channels may be created using both types. Other common materials used in microfluidic device fabrication could also be used, including but not limited to: poly-carbonate (PC), poly-propylene (PP), poly-sulfone (PS, PSU, PSUL), Polyetherimide (PEI, Ultem), SU-8 photocurable epoxy, Norland optical epoxies, various laminates, fluorinated ethylene propylene (FEP), cyclic olefin copolymer (COC), and glasses such as borosilicate, sodalime, etc.

The optical cell further comprises an optical input opening 110 coupled with a first end of the sensing channel 106 for delivering the probe light to the sensing channel, and one or more optical detection openings (in FIGS. 1 and 2, optical detection openings 112a-b) that are coupled with the sensing channel 106 and which receive probe light having interacted with the liquid in the sensing channel 106. A light guide channel 116 may extend within the inlaid sheet and couple the optical input opening 110 and the first end of the sensing channel 106. In use, a light source such as an LED may be placed over the optical input opening 110. The light guide channel 116 may help to isolate a light detector from the light source by adding distance between the two. The optical detection openings may be provided for obtaining different types of measurements on the liquid sample. For example, the first optical detection opening 112a, which is coupled to the sensing channel 106 proximate a first end of the sensing channel where the probe light is incident to the channel, may be used for performing fluorescence measurements and/or scattering measurements. For performing fluorescence measurements, a filter may be provided to filter certain wavelengths. The second optical detection opening 112b is coupled to the second end of the sensing channel 106 where probe light having interacted with the liquid sample exits the sensing channel 106. The second optical detection opening 112b may be used for performing absorption measurements, for example, by placing a photodiode or spectrometer above the second optical detection opening 112b. A benefit of this optical cell is the ability to use light sources and detectors external to the chip. By coupling both to a printed circuit board (PCB) located directly above the cell, near-instant signal processing may occur with minimal wiring.

Note that while first and second optical detection openings 112a-b are shown, the optical cell may only comprise optical detection opening 112a or optical detection opening 112b. If there is no optical detection opening 112b coupled to the second end of the sensing channel 106, an optical reflector such as a mirror may for example be placed at the second end of the sensing channel 106 to reflect the probe light back through the sensing channel 106 and out through the optical inlet opening 110.

As described in more detail herein, the optical input opening 110 and the optical detection openings 112a-b may be formed by cutting into the clear material (such as clear material 102a) from a surface thereof to a depth of the sensing channel 106. The recesses of the clear material 102a, and the shape of the opaque material 102b inserted into the clear material 102a, is configured such that the openings are surrounded circumferentially by the opaque material 102b (see, e.g., FIG. 1A). The sensing channel 106, cut into the inlaid sheet 102, thus crosses between the clear material 102a at the openings and the opaque material 102b elsewhere, and is thus primarily enclosed by the opaque material 102b and 104b. This helps to ensure that light is transmitted from one side of the sensing channel 106 to the other almost exclusively through the sensing channel.

While the figures depict the optical input opening 110 and the optical detection openings 112a-b as being vertical, it is noted that the openings may also be cut into the material at an angle (such as +/−45 degrees to vertical). The optical input opening 110 and the optical detection opening 112b may further comprise v-shaped prisms 114 cut into the clear material for directing the probe light into the sensing channel 106 and out of the optical cell. As previously described, the prisms 114 direct the light using TIR, and may be set at an angle dependent upon the cell material and the wavelength of incident light. This approach allows for freedom of source/detector location.

The optical cell may further comprise fluid inlet and outlet ports respectively coupled with the first and second ends of the sensing channel 106 (see, e.g., fluid port 118 cut in the opaque material 102b in FIG. 1A coupled with the second end of the sensing channel 106). A corresponding port may be cut into the clear material in the optical detection opening 112b for coupling to the sensing channel 106. The optical cell may further comprise fluid inlet and outlet channels 120 arranged in the clear material (for example, clear material 102a) and respectively coupled with the fluid inlet and outlet ports. The fluid thus crosses between the clear material 102a and the opaque material 102b. The fluid inlet and outlet channels 120 may receive fluid from vias 122, for example. Continuous flow systems can also be deployed, injecting small volumes into a continuous sample stream and lowering volume per sample measurement to picoliter or femtoliter levels The fluid inlet and outlet channels 120 may be coupled to the fluid inlet and outlet ports 118 at an angle of 135 degrees or less relative to the sensing channel 106. The fluid inlet and outlet channels 120 may also be coupled to the fluid inlet and outlet ports 118 at opposing sides of the sensing channel 106. For example, as shown in FIG. 1B, the fluid inlet and outlet channels 120 and the sensing channel 106 may form a z-shape pattern. The location where the fluid inlet and outlet channels 120 and the sensing channel 106 meet may thus form an elbow joint. The fluid inlet and outlet channels 120 may also be coupled to the fluid inlet and outlet ports at an angle relative to horizontal.

Furthermore, the sensing channel 106 may have a well structure 122 along a length thereof with increased fluid volume where the first optical detection opening 112a is coupled to the sensing channel 106. The well structure 122 is perhaps best seen in FIG. 1B, and may for example be configured as a section of sensing channel 106 with a larger circumference or perimeter relative to the remainder of the sensing channel 106. As described in more detail with reference to FIG. 9, providing the well structure 122 may help to improve detection of a fluorescence signal.

Various modifications may also be made to the design of the optical cell without departing from the scope of this disclosure. As one example, side-scatter and back-scatter optical channels can also be integrated into the microfluidic device based on this inlaying technique. A fluid with particles (cells, suspended matter, etc.) flowing through the optical channel could be illuminated from the absorbance LED and optical channels at various pre-defined angles and would enable particle-sizing and sample characterization.

Figure 3:
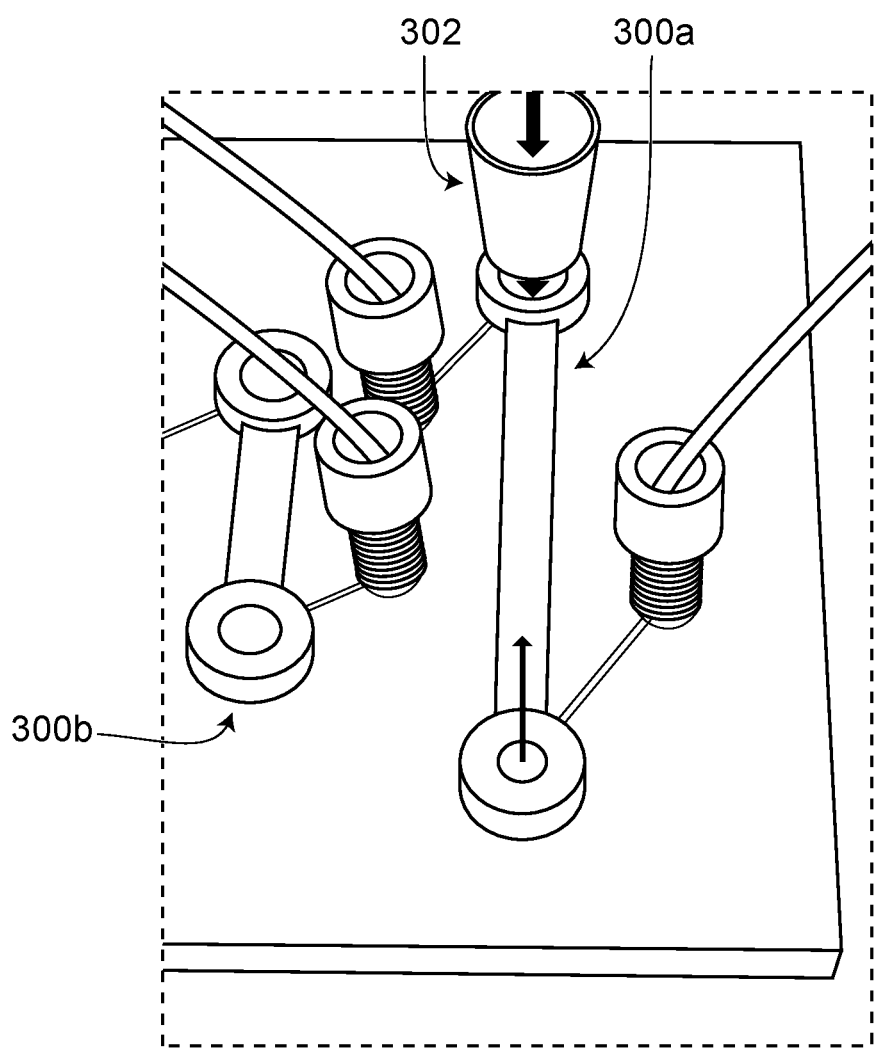
FIG. 3 shows a configuration of a plurality of optical cells having different path lengths on a chip.

FIG. 3 shows a configuration of a plurality optical cells having different path lengths on a chip. As further described with reference to FIGS. 4 and 5, the optical cell 100 may be readily integrated into a microfluidic chip for performing fluid analysis. Moreover, a plurality of optical cells, including optical cells of different path lengths, may be integrated onto the same chip.

FIG. 3 shows a first optical cell 300a having a 50 mm sensing channel and a second optical cell 300b having a 25 mm sensing channel disposed on the same microfluidic chip. An LED 302 is shown as being positioned over the opening at one end of the optical cell 300a, and a transmitted beam is shown as being emitted from the other end of the optical cell 300a.

As evident from FIG. 3, a microfluidic cell may comprise a plurality of optical cells, which may for example have sensing channels of different lengths. The plurality of optical cells may be fluidly coupled to each other such that the liquid sample flows through the plurality of optical cells in series. Further, the plurality of optical cells may be optically coupled to each other via optical reflectors. A total fluid path length and optical path length may thus be greatly increased relative to a length of a single sensing channel, and may for example reach lengths of up to 10 m by way of serially coupling many optical cells. Furthermore, two optical cells of different path lengths may be configured in an "L-shape" or "180-degree shape" sharing an illumination prism (i.e. the light from a single LED reflects down both cells) with separate detectors prisms.

Figure 4:
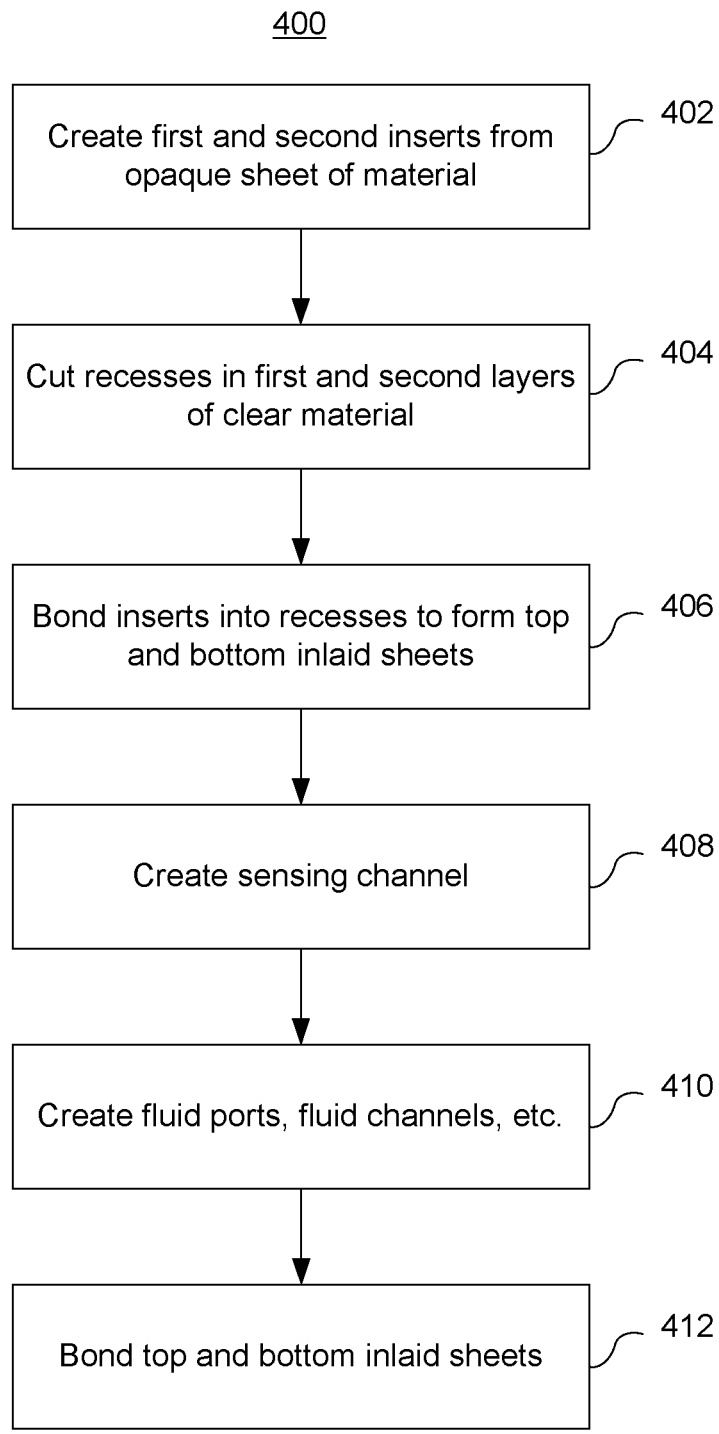
FIG. 4 shows a method of manufacturing an optical cell.
Figure 5:
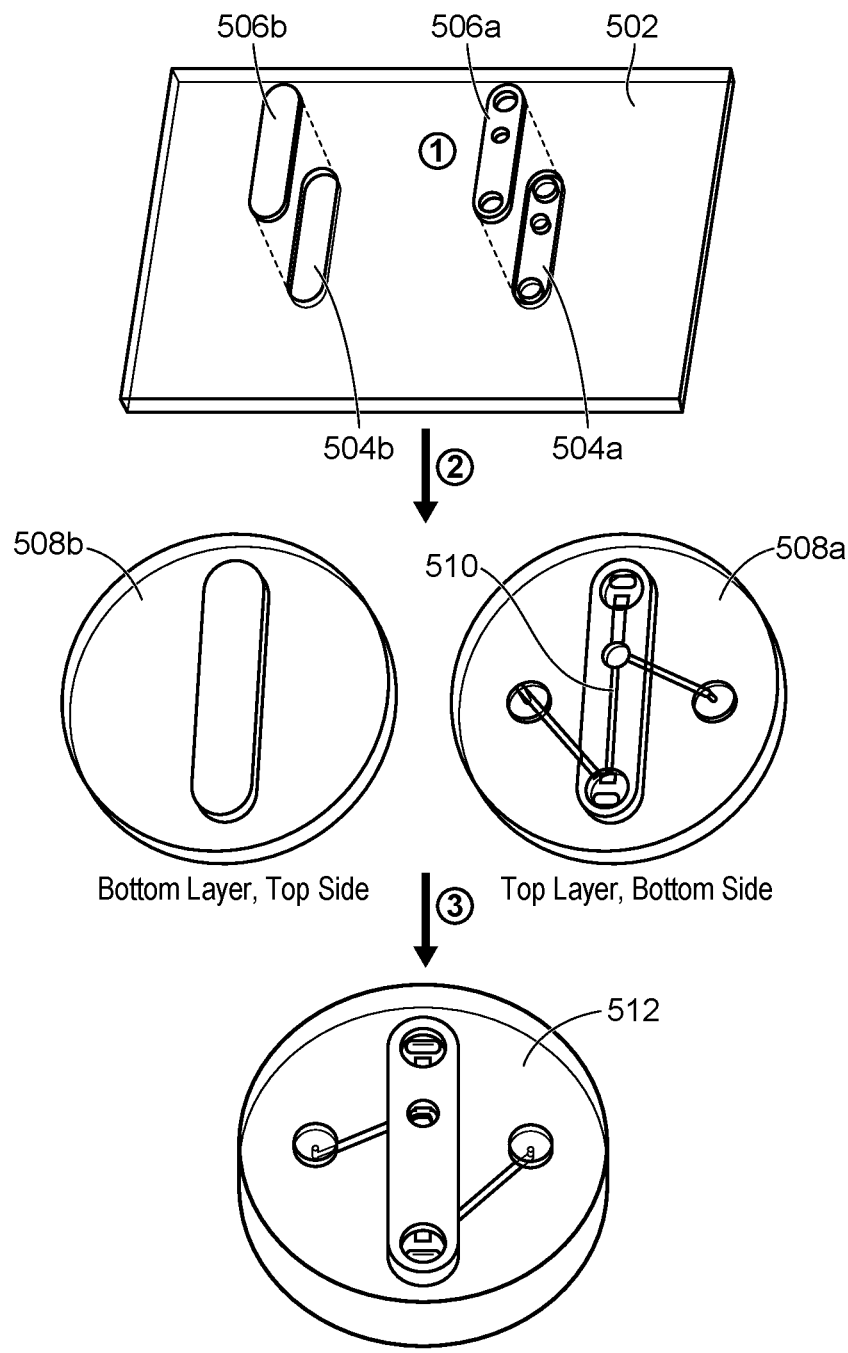
FIG. 5 shows a fabrication process of manufacturing a microfluidic chip comprising the optical cell.

Reference is made concurrently to FIG. 4 and FIG. 5 for manufacturing the optical cell as part of a microfluidic chip. FIG. 4 shows a method of manufacturing an optical cell. FIG. 5 shows a fabrication process of manufacturing a microfluidic chip comprising the optical cell.

Two inserts are cut from opaque material to be inserted into recesses of clear material (402). Corresponding recesses are cut in clear sheets of material for respectively receiving the inserts made of opaque material (404). The recesses in the clear material are of matching dimensions to their corresponding insert except with an added tolerance such as 25 μm on all sides, which helps to compensate for microscopic deformities and imprecise milling so that the inserts fit tightly within the recesses. As previously described, the materials used may be PMMA or others mentioned above. The opaque material may have approximately 0% light transmittance, and the clear material may have greater than approximately 90% light transmittance. Moreover, one or both of the opaque material and the clear material may be configured to filter selected wavelengths.

As seen in FIG. 5, a sheet of clear material 502 comprises recesses 504a and 504b, for respectively receiving inserts of opaque material 506a and 506b. Two separate sheets of clear material could instead be used. The length of the inserts are dependent in part upon the length of the sensing channel, which may for example range from between 0.1 mm and 100 mm. As also seen in FIG. 5, cutting the recesses in the clear material may further comprise defining ridges for openings to be cut extending partially through the material in what will become a first layer of the clear material in the assembled optical cell, and the corresponding opaque insert 506a may be shaped with holes to completely surround the openings. There may be an optical input opening and at least one optical detection opening cut into the clear material. The second opaque insert 506b has the same shape as the first insert 506a, but does not comprise the holes extending there-through so as to block incident light not directed into the channel as described with reference to FIG. 1.

The opaque inserts 506a-b are pressed into the recesses 504a-b of the clear material and bonded to form first and second inlaid sheets (406). In FIG. 5, first and second inlaid sheets 508a-b may be cut from the sheet of clear material after insertion of the opaque inserts 506a-b. The inserts may be bonded with the recesses of the clear sheets with a solvent, thermal, and pressure process. To achieve a fluid-tight seal between the two plastics that ensures uncompromised fluid handling, solvent depolymerization then repolymerization may be performed.

Prior to bonding, a pre-treatment may be performed for each surface. Pre-treatment included sanding rough edges with a fine-grit paper and light scrubbing such as with a scotch pad sponge with water and detergent. A brush can be used to scrub inside the cavities. A rinse, such as with Milli-Q may be conducted, and surfaces may be dried with blasts of compressed air or lab-grade nitrogen gas and IPA. After pre-treatment, substrates were ready for bonding. Chloroform may be preheated to 30° C. in a sealed container or petri dish. Chloroform-vapor exposure is performed by suspending each substrate 2 mm above the chloroform liquid line, face down for 45 seconds. After chloroform exposure, the inserts were quickly slotted into the cavities and pressed for approximately half a minute. Next, the clear sheet with the inlay ensemble was pressed for 2.5 hours in an LPKF Multipress II set to a pressure of 625 N/cm² and a temperature of 115° C. to approach the glass transition temperature of PMMA. After pressing, minor protrusion of the opaque inserts may be observed from the sheet. The area that would encompass the entire chip design may be milled down by a small amount, approximately 0.3 mm, to restore uniformity and prevent delamination when bonding the top and bottom layers together later during the fabrication.

A sensing channel is created along a bonding surface of at least one of the first/second inlaid sheets (408). In addition, other components such as a light guide channel, inlet/outlet fluidic channels, alignment holes, vias, syringe ports, and prisms, may be created (410). These can be milled into the appropriate spots within the inlaid sheet to realize the microfluidic design. FIG. 5 shows sensing channel 510 cut into the bonding surface (i.e. a bottom surface of the top layer) of the inlaid sheet 508a, which is cut between two openings in the clear material and extends through the opaque insert. A light guide channel may also be cut that extends along the bonding surface of the first/second inlaid sheet that couples the optical input opening and the sensing channel. The first insert of the opaque material and openings in the clear material may also be cut to define fluid inlet and outlet ports respectively coupled with first and second ends of the sensing channel. Fluid inlet and outlet channels may be cut in the first layer of the clear material that are coupled to the fluid inlet and outlet ports of the first insert of the opaque material. Prisms may be cut in the optical input opening and/or the optical detection opening at a depth of the sensing channel.

The fluidic channels may be milled depending on application parameters but may for example be approximately 400 μm wide and 600 μm deep and be milled into the top layer using a corresponding mill bit. The prisms may be created by cutting into the top layer using a 45-degree end-mill to a specified depth. FIG. 5 shows an example of first and second inlaid sheets 508a-b with various features created therein.

The first and second inlaid sheets are bonded (412). Prior to bonding, the first and second inlaid sheets may be cut to a desired size, and left for approximately 12 hours heated to a temperature of approximately 85° C. to release residual stress and/or solvent vapor trapped within the inlay. The first and second inlaid sheets may be bonded together using a 45 seconds chloroform-vapor exposure time and similar bonding and pressing parameters as above but with a slightly lower bonding temperature such as 85° C. FIG. 5 shows a microfluidic chip 512 formed from the first and second inlaid sheets 508a-b.

As previously described, a microfluidic chip may comprise a plurality of optical cells formed therein. As would be evident to a person skilled in the art, in the method for manufacturing described above the first and second inlaid sheets may be prepared for forming multiple optical cells by cutting a plurality of opaque inserts and corresponding recesses in the clear material.

To validate the optical cell, two nutrients fundamental to aquatic ecosystems were measured: nitrite and phosphate, over three different lengths of sensing channels: 10, 25, and 50 mm. Light-absorbance measurements of nitrite samples reacted with the "Griess" reagent is considered a gold-standard approach. Under acidic conditions, a purple azo dye with peak absorbance near 540 nm will form in the presence of nitrite. Phosphate detection is enabled using an acidic ammonium molybdate/metavanadate based reagent, hereby referred to as phosphate reagent, which forms a yellow complex proportional to phosphate concentration with maximum absorbance in the UV region at 375 nm. With both chemistries, the inlaid microfluidic absorbance cell as disclosed herein produced results in agreement with literature and are thus acceptable to be used for automated in situ sensors. Other phosphate chemistries (EPA 365.2) that absorb in the 880 nm range are also possible with an infrared LED. Similarly, nitrate measurement can be performed using established Vanadium-reduction that yield nitrite to be reacted with Griess reagent, thereby enabling nitrate measurement with the same optical system. Nitrite on its own can also be measured using the Griess reagent without vanadium reduction Performance of the absorbance cell was first characterized with two different colors of food dye that had peak absorbances near those of reacted nitrite and phosphate. Red food dye standards were prepared by two-fold serial dilutions of a 0.1% stock, made from dilution of 0.1 mL red food dye (commercial food coloring, Club House Canada) to 100.0 mL with Milli-Q water. Yellow food dye standards were similarly made from diluting a 0.1% stock, made in the same way (commercial food coloring, Club House Canada). Nitrite standards were prepared via stepwise dilution of a 1000 11M stock, mixed from 0.069 g of sodium nitrite (NaNO2, CAS-No: 7632-00-0, EMD Millipore, Germany) and Milli-Q to a total volume of 1 L. Phosphate standards were prepared similarly from a 1000 11M stock, produced by diluting 0.1361 g of potassium phosphate monobasic (KH2PO4, BP362-500 LOT 184646, Fisher Scientific) to 1 L with Milli-Q. Standards were stored in darkness near room temperature between use.

The reagents were prepared so that reagent molecules were in excess of expected nitrite/phosphate ions to ensure color-development is proportional to concentration. The Griess reagent was prepared by combining 0.5 g of sulfanilamide, 5 mL of concentrated HCl, and 0.05 g of NEDD (N-(1-Naphthyl)ethylenediamine dihydrochloride), mixed with Milli-Q to a final volume of 500 mL. Finally, phosphate reagent was prepared by mixing 0.3601 g of ammonium metavanadate and 7.2 g of ammonium molybdate with 95 mL of concentrated HCl, and brought to a final volume of 1 L with Milli-Q. Constant stirring ensured proper mixing and dissociation of any precipitates formed, and the reagent was allowed to cool to room temperature after the exothermic reaction upon addition of HCl. Chemistry components were of analytical grade, and completed reagents were stored near 4° C. in a dark environment between use.

Two LEDs centered at $\Delta_1$=527 nm (Cree C503B-GAN-CB0F0791-ND, FWHM=15 nm) and $\Delta_2$=380 nm (Superbrightleds RL5-UV0315-380, FWHM=12 nm) were used to perform absorbance spectroscopy on reacted nitrite and phosphate samples—and their corresponding food dye samples—respectively with detection by a Digikey TSL257 High-Sensitivity Light-to-Voltage Converter (photodiode). A custom-built LED driver allowed adjustment of LED intensity while maintaining constant current. The voltage output of the photodiode was connected to a B&K Precision 5491B bench multimeter with $10^{-7}$ V precision. The sampling rate was set to its maximum, and each measurement along with their date and time was recorded on a personal laptop connected to the multimeter via USB.

LED intensity was adjusted with Milli-Q in the channel to maximize light detection without saturating the photodiode. Since sources and detectors were held externally to the chip, a single set of optical components (LED and photodiode) were used for all three path lengths and the entire testing process. To inspect a sample using one of the three optical cells, the relevant LED was held in place directly above a prism using a metal clamp and a photodiode was held face-down above the prism on the other end. Swapping between each of the three optical cells or changing LEDs between test series was simple due to the decoupled components: a useful advantage of this optical system. A custom opaque enclosure was placed over the entire testing apparatus to minimize background light reception.

Fluid injection for the red food dye and nitrite tests was performed manually with syringes. Yellow food dye and phosphate tests were completely automated using an off-the-self Cavro XC syringe pump (PN 20740556-C, Tecan Systems, San Jose, Calif.) and a Vici Cheminert C65Z 10-port selector valve (Model No. C65-37101A, Valco Instruments Co. Inc., Houston Tex.). Each of the four inspected species were analyzed using all three optical channels a total of three times each. At the start, end, and between each sample, Milli-Q was pumped through the channel to flush the system and reduce sample-sample crosstalk. This also served as a blank measurement for all but the phosphate tests wherein a 1:1 volumetric mix of Milli-Q and reagent was used instead to serve as the blank since the inherent color of the reagent itself was a light-yellow. All samples and blanks were analyzed for a period of five minutes; the average voltage over the final minute was used to determine absorbance. Nitrite samples were analyzed immediately following reaction with the Griess reagent whereas phosphate samples were premixed several hours before analysis permitting complete reaction. Finally, at the beginning and end of every test, a measurement of the background light was taken over a minute interval. These values were usually very small relative to the blank reading and were averaged together for use with equation (3) to account for background light. Other mixing ratios could be used, depending on the chemistry utilized.

Figure 6:
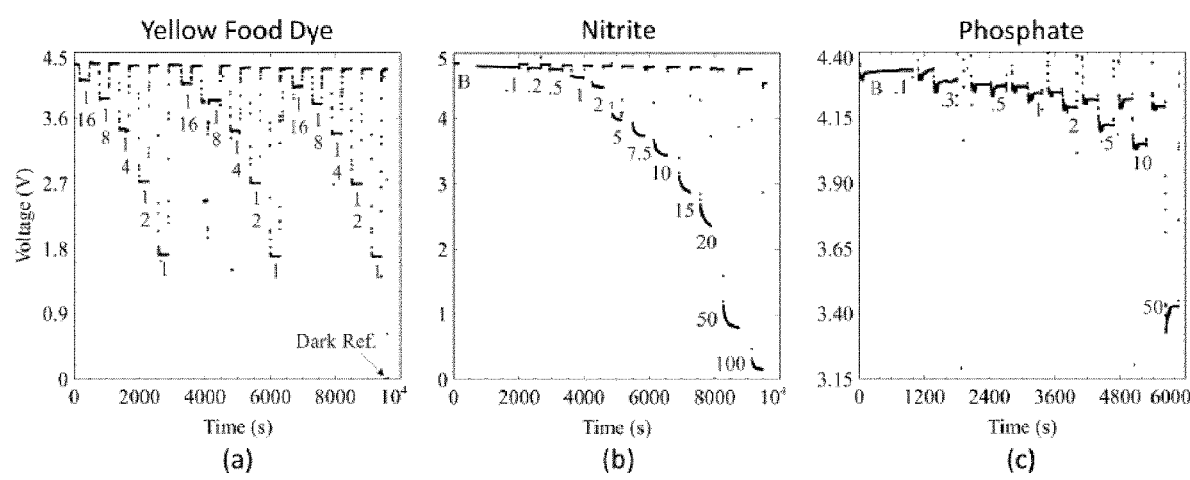
FIG. 6 shows raw photodiode voltage vs. time of typical (a) yellow food dye, (b) nitrite, and (c) phosphate experiments through the inlaid optical cell.

FIG. 6 shows raw photodiode voltage vs. time of typical (a) yellow food dye, (b) nitrite, and (c) phosphate experiments through a 10.4 mm inlaid optical cell. The dye plot in (a) depicts an entire triplicate with labels normalized to the highest concentration sample: 0.1%. The nitrite and phosphate plots depict a single trial within a triplicate, and labels indicate the concentration of the associated standard before mixing with reagent. Blanks are analyzed between successive samples.

The performance of the inlaid optical cell design was first evaluated with stable food dyes before analyzing nutrient samples. Food dye calibration tests are a standard benchmark towards proving robust, accurate, and reliable light-absorbance measurements of an optical cell. There are several external factors that may influence the light-absorbance of a reacted nutrient sample with reagent. These include sample degradation, reagent degradation, incorrect sample or reagent make-up, and the kinetics of the reaction between nutrient and reagent. In the case where samples do not produce the expected results—i.e. conforming to the Beer-Lambert law given by equation (2)—it is difficult to determine if the design of the optical cell is at fault or the analyzed samples themselves. Red dye was chosen to mimic reacted nitrite due to its absorbance spectrum with a strong absorbance peak in the same 540 nm region. Using the 527 nm LED, light-absorbance measurements were taken through red dye samples ranging from 0.0016 to 0.05% (v/v). Similarly, yellow food dye was chosen due to mimic reacted phosphate where the peak absorbance spectrum was 375 nm and inspected using the 380 nm LED A range of yellow dye was tested between 0.0063%-0.1% (v/v). After successful food dye experiments, nitrite samples were reacted with the Griess reagent and analyzed. Nitrite standards ranged in concentration from 0.1 µM to 100 µM and were measured using the 527 nm LED, after mixing in a 1:1 volumetric ratio with reagent. Therefore, the final concentration of each analyzed sample was half that of the standard. Finally, phosphate standards between 0.1 µM-50 µM were reacted with phosphate reagent and were analyzed using the 380 nm LED.

FIG. 6(a) shows five concentrations of yellow food dye analyzed a total of three times through a 10.4 mm long inlaid optical cell; each series produced consistent results. Milli-Q blanks preceded each sample as described above. Near the 4,000 second mark, a temporary drop in voltage can be observed: this was likely the result of an air bubble in the measurement channel during stopped flow. Additional sample was injected into the cell to displace the bubble, which restored the expected voltage reading as seen before and after this drop. Finally, at the end of the trial, a measurement was taken to quantify the background light by turning off the LED light source. This is labelled as "Dark Ref." on FIG. 6(a) and was consistently 7 mV±1 mV throughout experiments in this manuscript, highlighting the effectiveness of our design in minimizing background light contributions.

FIG. 6(b) depicts the results of a nitrite experiment performed using 12 standards with Milli-Q blanks between them and with concentrations labelled on each plateau. Nitrite samples were analyzed immediately after mixing with the Griess reagent. The reaction kinetics can be observed by the color-development of each reacting sample; i.e. voltage over time. Initially, there was a rapid drop in voltage at the beginning of each reaction followed by a gradual decrease until a plateau was reached. The lower-concentration nitrite samples, less than 5 µM, appear to have completely reacted almost immediately, attaining 95% of the plateau value within 15 seconds. The higher-concentration nitrite samples, near 50 µM, took longer to react and required 44 seconds to attain 95% of the plateau value.

FIG. 6(c) shows the results of a phosphate experiment performed with 8 standards. Here, the blank was a 1:1 volumetric mix of Milli-Q and phosphate reagent, which was injected between standards. The sequence of injection was blank, sample and then pure Milli-Q water. The Milli-Q water flush was used as a precaution to minimize crosstalk between standards. The Milli-Q flush can be observed in FIG. 6(c) as sudden voltage spikes which saturate the photodiode since the pure Milli-Q is colorless compared to the blank (LED intensity is set based on blank). For the phosphate experiments, samples were fully reacted prior to injection into the optical cell. The yellow method has similar development times to the Griess method: 1-5 minutes. The phosphate was pre-reacted to benchmark stable nutrient samples; hence, the relatively constant voltage plateaus. In FIG. 6(c), a minor drift of the blank voltage is observed, decreasing 100 mV over the 6,000 second duration of the experiment, which was less than a 2% drop over 1.5 hours. The yellow dye experiment in FIG. 6(a) also drifted down, 70 mV over 6,000 seconds, but this is less visible because of the y-axis scale. The drift was repeatedly observed for the phosphate and yellow dye measurements, indicating it is not the phosphate chemistry. The gradual voltage decrease between blanks is most likely due to UV-fluid interaction or ageing of the PMMA plastic through prolonged intense UV-exposure.

Figure 7:
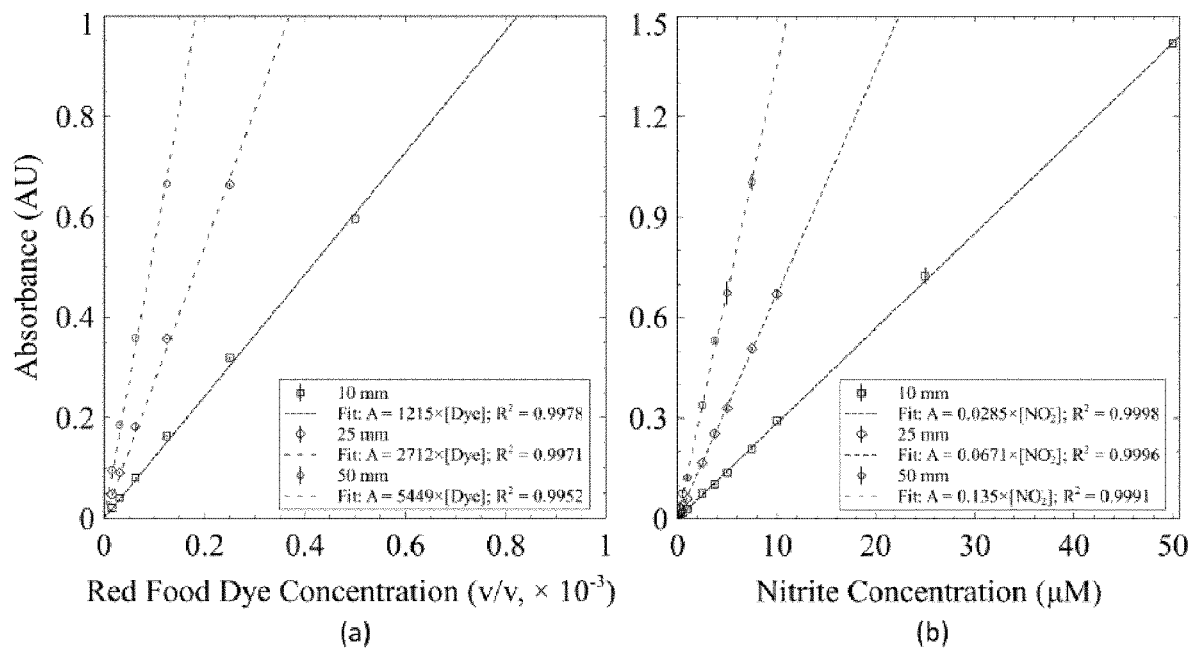
FIG. 7 shows absorbance versus concentration for (a) red food dye and for (b) reacted nitrite samples.

FIG. 7 shows absorbance versus concentration for (a) red food dye and for (b) reacted nitrite samples. The nitrite concentration represents the final concentration in the flow cell after mixing with Griess reagent. The absorbance of each sample concentration is the average from three experiments with vertical error bars representing standard deviations. Linear fits are shown with R2>0.99, as expected by equation (2).

Light-absorbance of each species was characterized using three inlaid microfluidic cells with optical path lengths of 10.4 mm, 25.4 mm, and 50.4 mm, labelled as 10 mm, 25 mm, and 50 mm in the legend, respectively. In practice, shorter optical channels are used to detect highly concentrated samples, but they are less sensitive (smaller slope in Beer-Lambert law). Longer channels are used for detecting small variations and low concentrations but are also more susceptible to noise from bubbles and particulates. Each calibration curve depicted in FIG. 7 represents the average of three independent experiments, except the 10.4 mm nitrite series where only two trials were performed. Equation (3) was used to calculate the absorbance of each sample from their associated photodiode readings, referenced to the voltage of the prior blank and the voltage produced from background light. Linear trendlines with forced-zero intercepts were fit to each series with strong agreement to the data.

In FIG. 7(a), each optical cell (10, 25 and 50 mm) was evaluated with four to six different concentrations depending on the path length. The 10 mm path length was evaluated with six samples and maintained linear results consistent with equation (2), even for the most concentrated samples. The 25 mm path length cell showed a linear relationship for the first five samples. The 50 mm path length showed a linear relationship for the first four samples. FIG. 7(b) depicts the absorbance of various concentrations of reacted nitrite samples. The final concentration of nitrite after mixing with reagent is used to reflect the true concentration in the absorbance cell. All twelve standards were analyzed using the 10 mm cell; whereas, the least-concentrated ten and nine standards were analyzed with the 25 mm and 50 mm cells, respectively. For the concentrations tested, it is clear that the inlaid optical absorbance cells showed excellent linear relationships.

Figure 8:
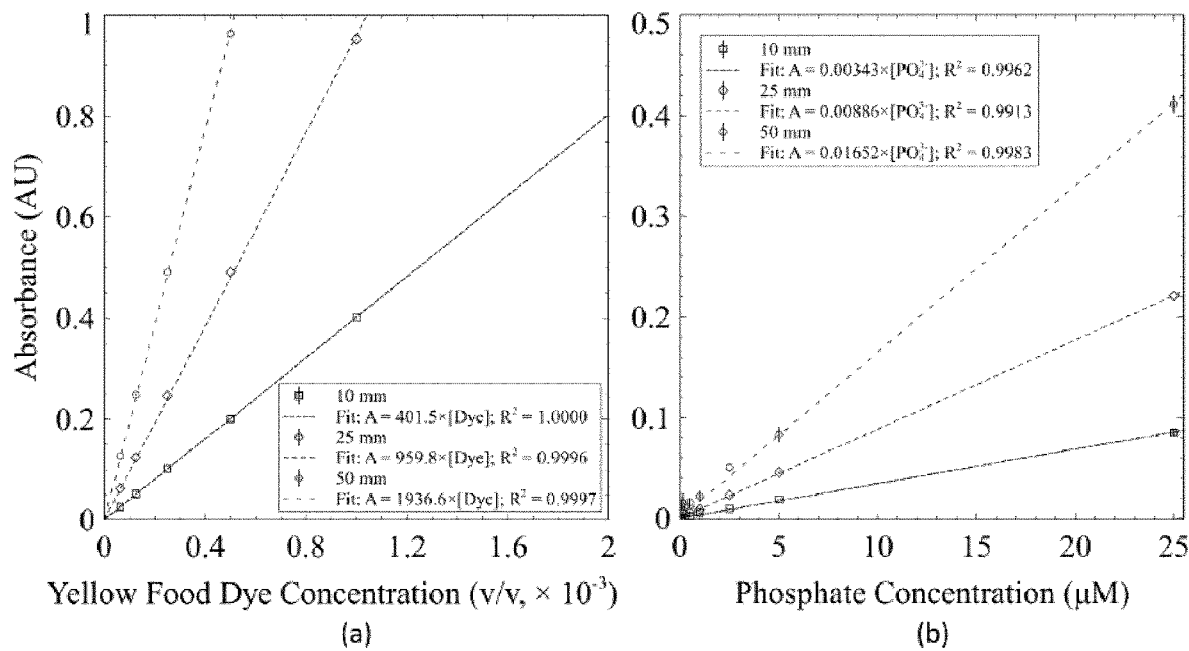
FIG. 8 shows absorbance versus concentration for (a) yellow food dye and for (b) reacted phosphate samples.

FIG. 8 shows absorbance versus concentration for (a) yellow food dye and for (b) reacted phosphate samples. The absorbance of each sample concentration is the average from three experiments with vertical error bars representing standard deviations. Linear fits are shown with R2>0.99, as expected by equation (2).

FIG. 8(a) depicts five yellow food dye samples analyzed with the 10 mm and 25 mm optical path lengths, and four samples analyzed on the 50 mm optical path length. All three data sets showed excellent linear fits for their entire concentration range. Similarly, in FIG. 8(b), the absorbance for all eight phosphate standards show the expected linear relationships.

Table 1 shows experimentally determined attenuation coefficients c for both red and yellow dyes, nitrite, and phosphate for all three optical path lengths tested. $\bar{\epsilon}$ is the average with standard deviation. $\sigma_{dye}$ is volume concentration such that $\sigma_{dye}=v_{dye}/v_{solution}$. These quantities are specific to the inspection light wavelengths, i.e. 527 nm for red food dye and reacted nitrite, and 380 nm for yellow food dye and reacted phosphate. An average attenuation coefficient of nitrite was found to be $\epsilon(NO_2^-)=0.0269$ $(\mu M\ cm)^{-1}$. The value is in agreement with literature values for $\epsilon(NO_2^-)$, which range between 0.014-0.039 $(\mu M\ cm)^{-1}$ for Griess reagent and light centered near 525 nm. Similarly, an average attenuation coefficient for phosphate was found to be $c(PO_4^{3-})=0.00335$ $(\mu M\ cm)^{-1}$. This value is also in agreement with literature values that range between 0.0036-0.00503 $(\mu M\ cm)^{-1}$ for the yellow method using light centered near 380 nm. For all three path lengths, the attenuation coefficients determined for nitrite and phosphate using these color-developing techniques agree with the literature which further supports the performance of this optical cell.

TABLE 1

| l (mm) | Red Food Dye $\epsilon_{RFD}$ $(\sigma_{dye}\ cm)^{-1}$ | $\bar{\epsilon}$ | Nitrite $\epsilon_{NO}$ $(\mu M\ cm)^{-1}$ | $\bar{\epsilon}$ | Yellow Food Dye $\epsilon$ $(\sigma_{dye}\ cm)^{-1}$ | $\bar{\epsilon}$ | Phosphate $\epsilon$ $(\mu M\ cm)^{-1}$ | $\bar{\epsilon}$ |
|---|---|---|---|---|---|---|---|---|
| 10.4 | 1168 | 1100 | 0.0273 | 0.0269 | 386.1 | 383 | 0.00330 | 0.00335 |
| 25.4 | 1068 | ± | 0.0264 | ± | 377.9 | ± | 0.00349 | ± |
| 50.4 | 1081 | 50 | 0.027 | 0.0005 | 384.24 | 4 | 0.00328 | 0.00012 |

The limit-of-detection (LOD) can be a useful measure of a sensing apparatus' measuring capabilities and is specific to each species measured. The resolution of the system can be quantified by measuring the average noise of n blanks. The LOD for both nitrite and phosphate was evaluated for each optical path length using the standard triple-sigma method, which uses three-times the blank baseline noise as a reference. A blank value of 4.80 V—just below photodiode saturation—was chosen to convert each LOD from voltage to absorbance units. The absorbances were then converted to concentrations by dividing by the respective slope for each species. Table 2 shows LODs for nitrite and phosphate for each optical path length; n represents the number of blanks analyzed, each over five minutes. The slopes depicted in FIG. 7(b) and FIG. 8(b) are used to convert absorbance to concentration for each path length.

TABLE 2

| | Nitrite | | | | Phosphate | | | |
|---|---|---|---|---|---|---|---|---|
| l (mm) | n | Avg. Blank Noise (mV) | LOD (mAU) | LOD (nM) | n | Avg. Blank Noise (mV) | LOD (mAU) | LOD (nM) |
| 10.4 | 23 | 3 ± 2 | 0.9 ± 0.6 | 30 ± 20 | 24 | 1.3 ± 0.9 | 0.3 ± 0.3 | 100 ± 80 |
| 25.4 | 31 | 4 ± 5 | 1.0 ± 1.3 | 14 ± 19 | 20 | 2 ± 2 | 0.6 ± 0.6 | 60 ± 70 |
| 50.4 | 22 | 3 ± 4 | 0.7 ± 1.0 | 6 ± 8 | 23 | 2.7 ± 1.8 | 0.7 ± 0.5 | 40 ± 30 |

These detection limits are consistent with those found in the literature. A notable trend is that, among each path length, the average noise of the nitrite blanks is greater than those of the phosphate blanks: this may be a consequence of the manual sample injection method used for the nitrite samples. A benefit of automated sample injection is more consistent injection flow rates between each sample. Although the LODs are 6 nM and 40 nM, the limit-of-quantification (LOQ) would be more appropriate as a lower sensing bound when these inlaid flow cells are integrated into marine sensors. Typically, the LOQ is ten times the blank noise, and in this case would be 20 nM and 150 nM for nitrite and phosphate, respectively.

Figure 9:
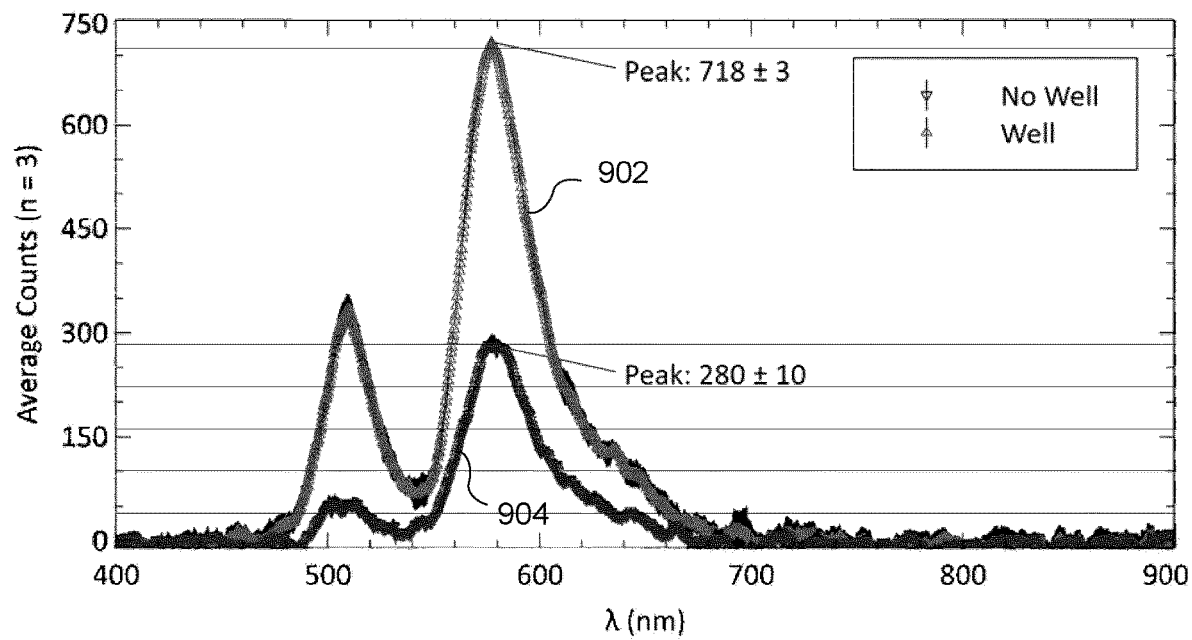
FIGS. 9 and 10 show fluorescence test data conducted with the inlaid optical cell.
Figure 10:
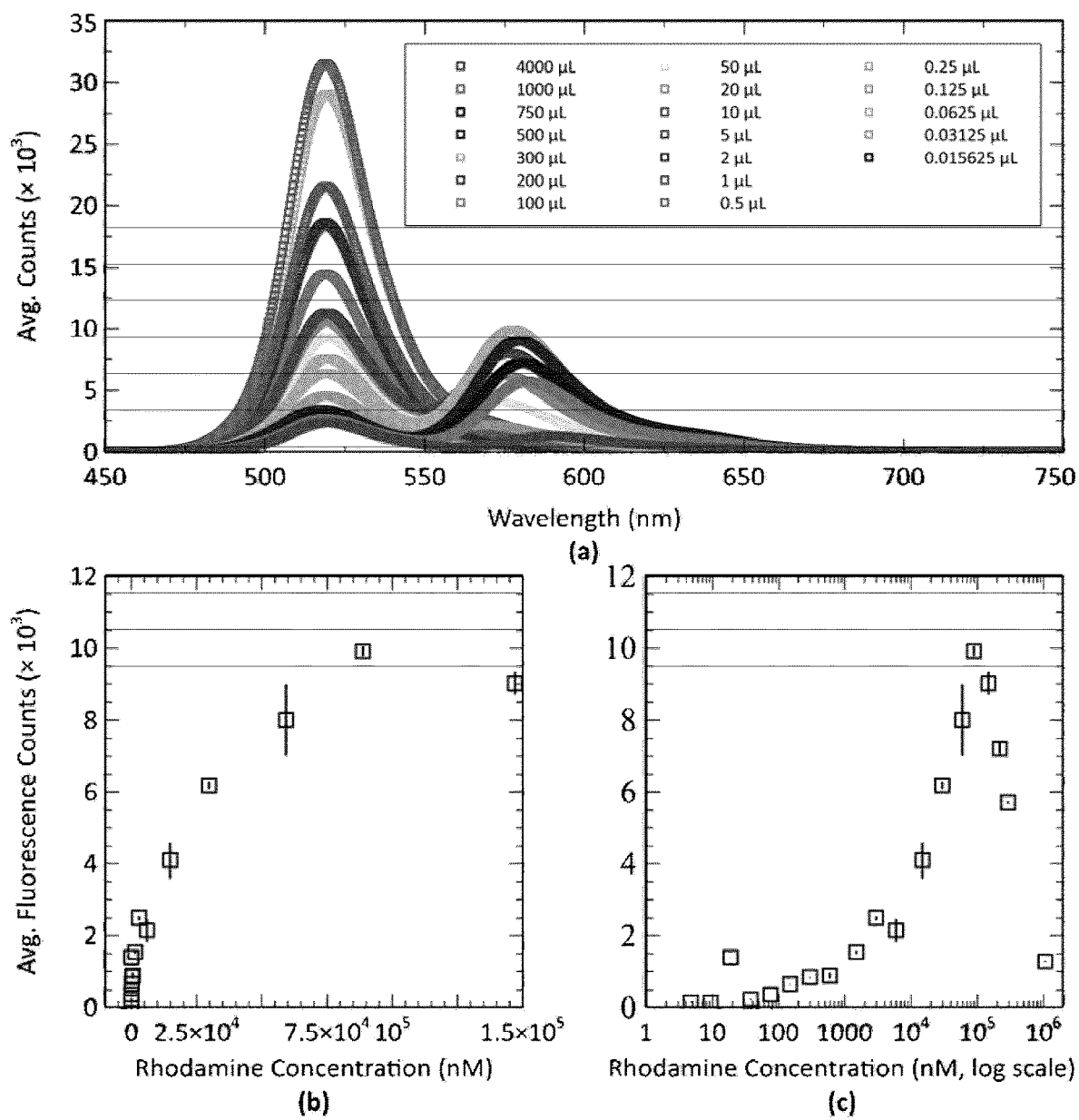

FIGS. 9 and 10 show fluorescence test data conducted with the inlaid optical cell.

Rhodamine samples ranging in concentration between 1.1 mM-4.7 nM were prepared from a 0.0104 M Rhodamine B stock solution. Table 3 below shows the concentration of each sample, numbered in order of preparation. Each sample was made by pipetting from the stock into 35 mL of Milli-Q water to achieve the intended concentration.

TABLE 3

| Sample Number | Rhodamine Conc. (M) |
|---|---|
| 1 | 1.1E−03 |
| 2 | 2.9E−04 |
| 3 | 2.2E−04 |
| 4 | 1.5E−04 |
| 5 | 8.9E−05 |
| 6 | 5.9E−05 |
| 7 | 3.0E−05 |
| 8 | 1.5E−05 |
| 9 | 6.0E−06 |
| 10 | 3.0E−06 |
| 11 | 1.5E−06 |
| 12 | 6.0E−07 |
| 13 | 3.0E−07 |
| 14 | 1.5E−07 |
| 15 | 7.5E−08 |
| 16 | 3.7E−08 |
| 17 | 1.9E−08 |
| 18 | 9.3E−09 |
| 19 | 4.7E−09 |

Rhodamine samples or Milli-Q water blanks were manually injected into the microfluidic chip via syringe. Samples were excited by directing light from a 516 nm LED into the fluid channel using prisms. A Flame Spectrometer was used to measure the output spectra to capture any fluorescence. Milli-Q water was injected through the chip after each Rhodamine sample to flush the system and remove inter-sample crosstalk. Light absorbance measurements are enabled by placing a second detector over the second prism as described above.

FIG. 9 shows the observed spectra of a 1.5 µM Rhodamine sample as measured using two chip designs. Each data set is the average of three measurements with error shown in black. Points 904 represent data obtained using a chip with a rectangular fluid channel (1×1 mm cross-section). Points 902 represent data obtained using the design with an expanded channel comprising the well structure at the measurement window as previously described and shown in FIG. 1B. A fluorescence signal was observed using both designs at ~577 nm with an improved signal observed using the "well" design.

FIG. 10 shows (a) measured spectra of various rhodamine samples of differing concentrations, and (b-c) measured fluorescence plotted vs. rhodamine concentration for each measured sample. Error bars represent the standard deviation of three individual measurements. A log scale is applied to the x-axis in (c), where more concentrated samples are included in the plot to demonstrate quenching effects.

An inlaid optical cell and manufacturing method are thus disclosed in which transparent and opaque material are combined to create an isolated absorbance cell within a microfluidic chip. Optical components are decoupled from the chip using integrated v-groove prisms to improve manufacturability. Light-absorbance measurements were performed using channels 400 µm wide and 600 µm deep. Optical path lengths were 10.4 mm, 25.4 mm, and 50.4 mm, for total sample volumes ranging between 2.5-12 µL. With optimizations, 100-200 µm channels can be achieved and thus nanoliters per measurement can be attained. Samples of varying food dye concentration as well as nitrite and phosphate samples were used to verify the measuring capabilities of this novel inlaid approach. Excellent linear relationships were observed between absorbance and concentration for all tested samples. Further, the capabilities of the optical cell for performing fluorescence measurements have been demonstrated.

It would be appreciated by one of ordinary skill in the art that the system and components shown in the Figures may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

What is claimed is:

1. An optical cell for performing light spectroscopy on a liquid sample, comprising:
    an inlaid sheet comprising an opaque material inlaid within a clear material;
    a sensing channel having first and second ends and providing a fluidic path for the liquid sample and an optical path for probe light between the first and second ends, wherein the sensing channel crosses the clear material and the opaque material;
    an optical input opening coupled with the first end of the sensing channel for delivering the probe light to the sensing channel; and
    at least one optical detection opening coupled with the sensing channel for receiving the probe light having interacted with the liquid sample.

2. The optical cell of claim 1, wherein the at least one optical detection opening comprises a first optical detection opening coupled to the sensing channel proximate the first end.

3. The optical cell of claim 2, wherein the sensing channel has a well structure with increased fluid volume where the first optical detection opening is coupled to the sensing channel.

4. The optical cell of claim 1, wherein the at least one optical detection opening comprises a second optical detection opening coupled with the second end of the sensing channel.

5. The optical cell of claim 1, further comprising fluid inlet and outlet ports respectively coupled with the first and second ends of the sensing channel.

6. The optical cell of claim 5, further comprising fluid inlet and outlet channels arranged in the clear material and respectively coupled with the fluid inlet and outlet ports.

7. The optical cell of claim 6, wherein the fluid inlet and outlet channels are coupled to the fluid inlet and outlet ports at least one angle of 135 degrees or less relative to the sensing channel.

8. The optical cell of claim 6, wherein the fluid inlet and outlet channels are coupled to the fluid inlet and outlet ports at opposing sides of the sensing channel.

9. The optical cell of claim 1, wherein the optical input opening and the at least one optical detection opening extend from a surface of the layer of clear material to a depth of the sensing channel.

10. The optical cell of claim 9, wherein the optical input opening comprises an input prism disposed in the optical input opening at the depth of the sensing channel for directing the probe light into the sensing channel.

11. The optical cell of claim 9, wherein an optical detection opening of the at least one optical detection opening comprises an output prism disposed in the optical detection opening at the depth of the sensing channel for directing the probe light out of the optical cell.

12. The optical cell of claim 1, wherein the optical input opening and the at least one optical detection opening are surrounded by the opaque material.

13. The optical cell of claim 1, further comprising a light guide channel extending within the inlaid sheet and coupling the optical input opening and the first end of the sensing channel.

14. The optical cell of claim 1, wherein the opaque material has approximately 0% light transmittance.

15. The optical cell of claim 1, wherein the clear material has greater than approximately 90% light transmittance.

16. The optical cell of claim 1, wherein one or both of the opaque material and the clear material are configured to filter selected wavelengths.

17. The optical cell of claim 1, wherein the sensing channel has a length between 0.1 mm and 100 mm.

18. The optical cell of claim 1, wherein the inlaid sheet comprises first and second inlaid sheets bonded together, the first inlaid sheet comprising a first opaque material inlaid in a recess of a first layer of clear material, and the second inlaid sheet comprising a second opaque material inlaid in a recess of a second layer of clear material; and wherein the sensing channel is provided at an interface of the first and second inlaid sheets.

19. A microfluidic cell, comprising the optical cell of claim 1.

20. A microfluidic cell, comprising a plurality of optical cells of claim 1.

21. The microfluidic cell of claim 20, wherein the plurality of optical cells are fluidly coupled to each other such that the liquid sample flows through the plurality of optical cells in series.

22. The microfluidic cell of claim 20, wherein the plurality of optical cells are optically coupled to each other via optical reflectors.

23. The microfluidic cell of claim 22, wherein a total optical path length of the plurality of optical cells is up to 10 m.

24. The microfluidic cell of claim 20, wherein a length of the sensing channel of at least two optical cells is different, the length of each of the sensing channels being between 0.1 mm and 100 mm.

* * * * *